Jan. 1, 1929.

G. D. SUNDSTRAND

MILLING MACHINE

Filed Jan. 16, 1924       3 Sheets-Sheet 1

1,697,698

Inventor:
Gustaf David Sundstrand

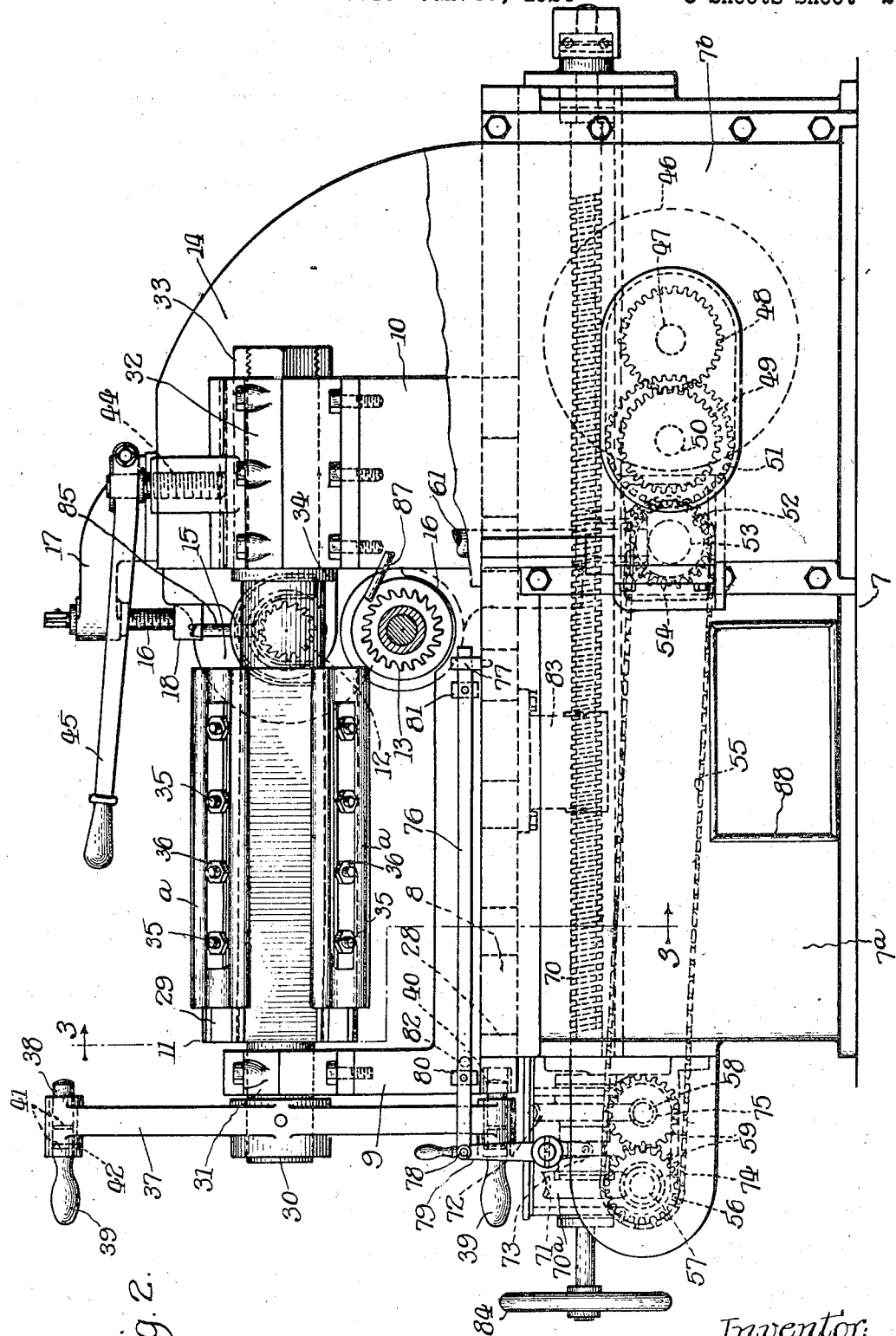

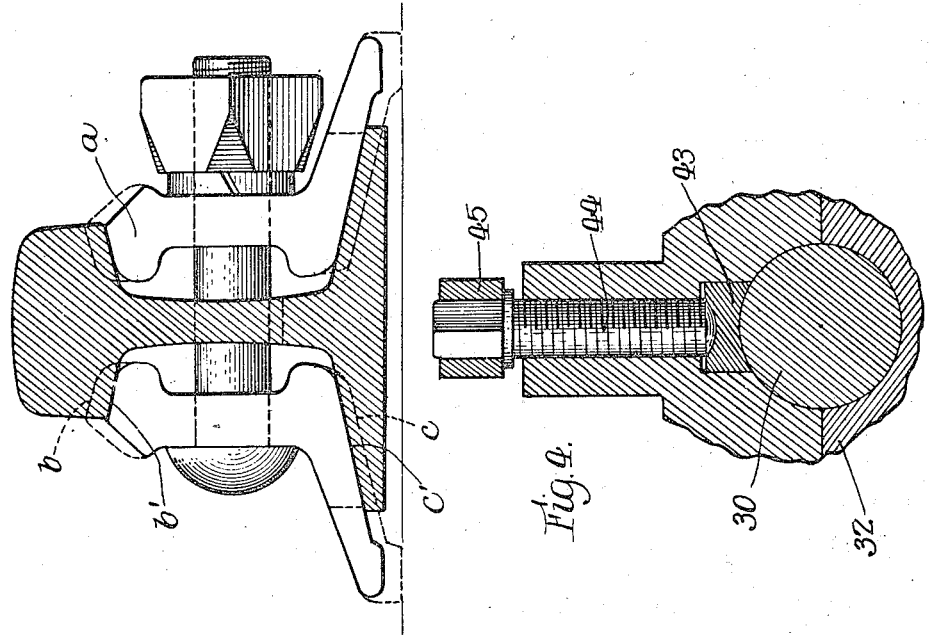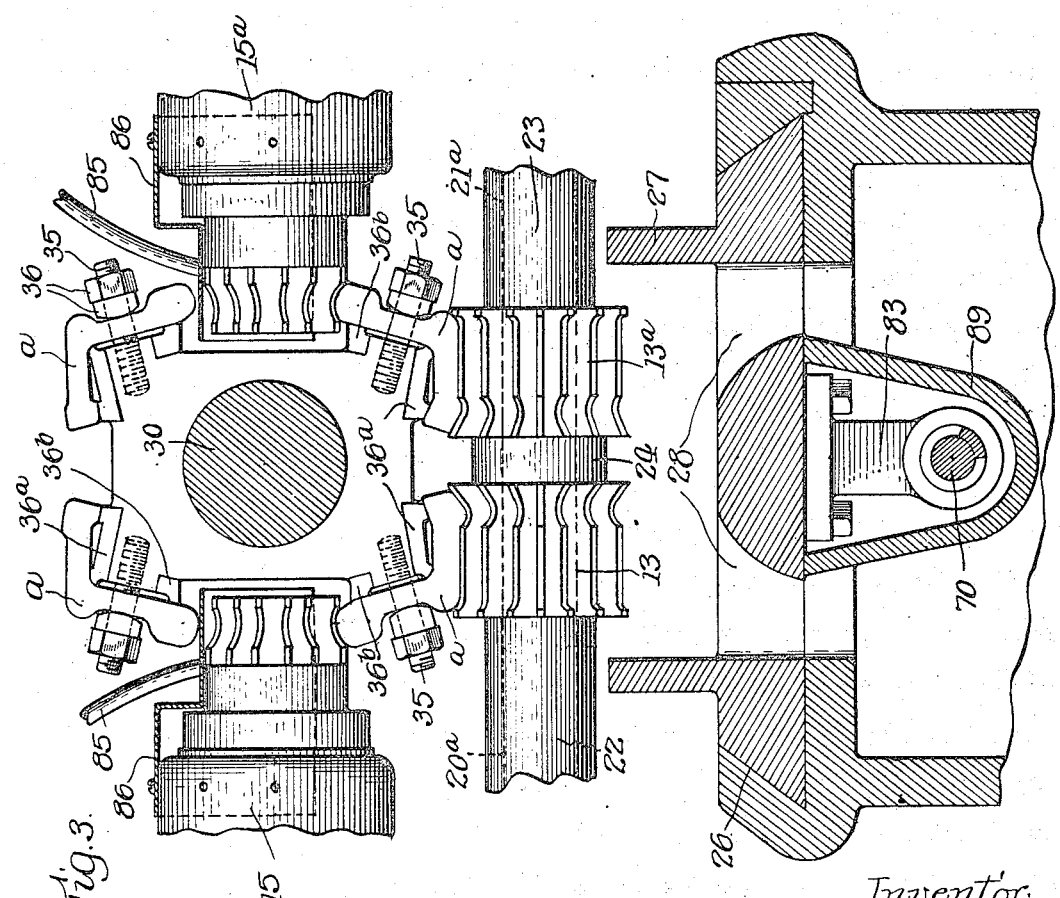

Patented Jan. 1, 1929.

1,697,698

UNITED STATES PATENT OFFICE.

GUSTAF DAVID SUNDSTRAND, OF ROCKFORD, ILLINOIS, ASSIGNOR, BY MESNE ASSIGNMENTS, TO SUNDSTRAND MACHINE TOOL CO., OF ROCKFORD, ILLINOIS, A CORPORATION OF ILLINOIS.

MILLING MACHINE.

Application filed January 16, 1924. Serial No. 686,519.

The invention relates in general to milling machines, but has particular reference to a machine of this class which is especially adapted for use in reclaiming worn tie members such as are commonly employed in railway construction for connecting the rails, and which are commonly termed "splice bars".

One of the problems which has long confronted railway construction and maintenance departments concerns the constant necessity for renewing such splice bars at frequent intervals. For many years these bars when worn were treated merely as scrap, and as such had very little value. From time to time efforts have been made to restore the bars to efficient condition by rerolling and drop-forging. These methods, however, have proven unsuccessful primarily because the operations result necessarily in a distortion of the metal, causing a displacement of the bolt holes such as to alter their standardized location. Still others have sought to avoid excessive waste by planing and by milling worn bars of the larger sizes so as to reduce them to smaller required sizes. The latter method has met with a measure of success, but the machines thus far produced have proven unsatisfactory because of the amount of time and labor required to operate them, because of their limited capacity, and because of the difficulty with which the chips are removed.

In producing the milling machine of my present invention, I have aimed to overcome the objections to former machines of this type and among the objects in view are to provide milling cutters capable of operating simultaneously upon the work so as to complete its reformation in one operation; to provide a work holder whereby while one or more pieces of work are being operated upon by the milling cutters, other pieces may be fastened in place upon the work holder; to so arrange the work holder as to render the fastening of the work in place as well as its removal extremely convenient; to provide for the easy disposition of the chips avoiding the necessity of removing the same by a blast of air as is the case with present machines; and to provide an arrangement whereby two bars may be completed simultaneously and in one operation.

A general object of my invention is to provide a machine which is exceptionally rugged in construction, with the milling cutters rigidly supported to prevent chattering; and which is otherwise of a very efficient character. I have shown in the accompanying drawings a preferred embodiment of my invention.

Therein,

Fig. 2 is an end view of the machine but with one column broken away to show the work holder support.

Fig. 3 is a fragmentary vertical sectional view taken substantially in the plane of line 3—3 of Fig. 2.

Fig. 4 is a fragmentary sectional view showing a detail of construction.

Fig. 5 is a sectional view through a railway rail illustrating the manner in which the splice bars when reduced in size may be reemployed, the original size of the bars being shown in broken lines.

Figure 1:
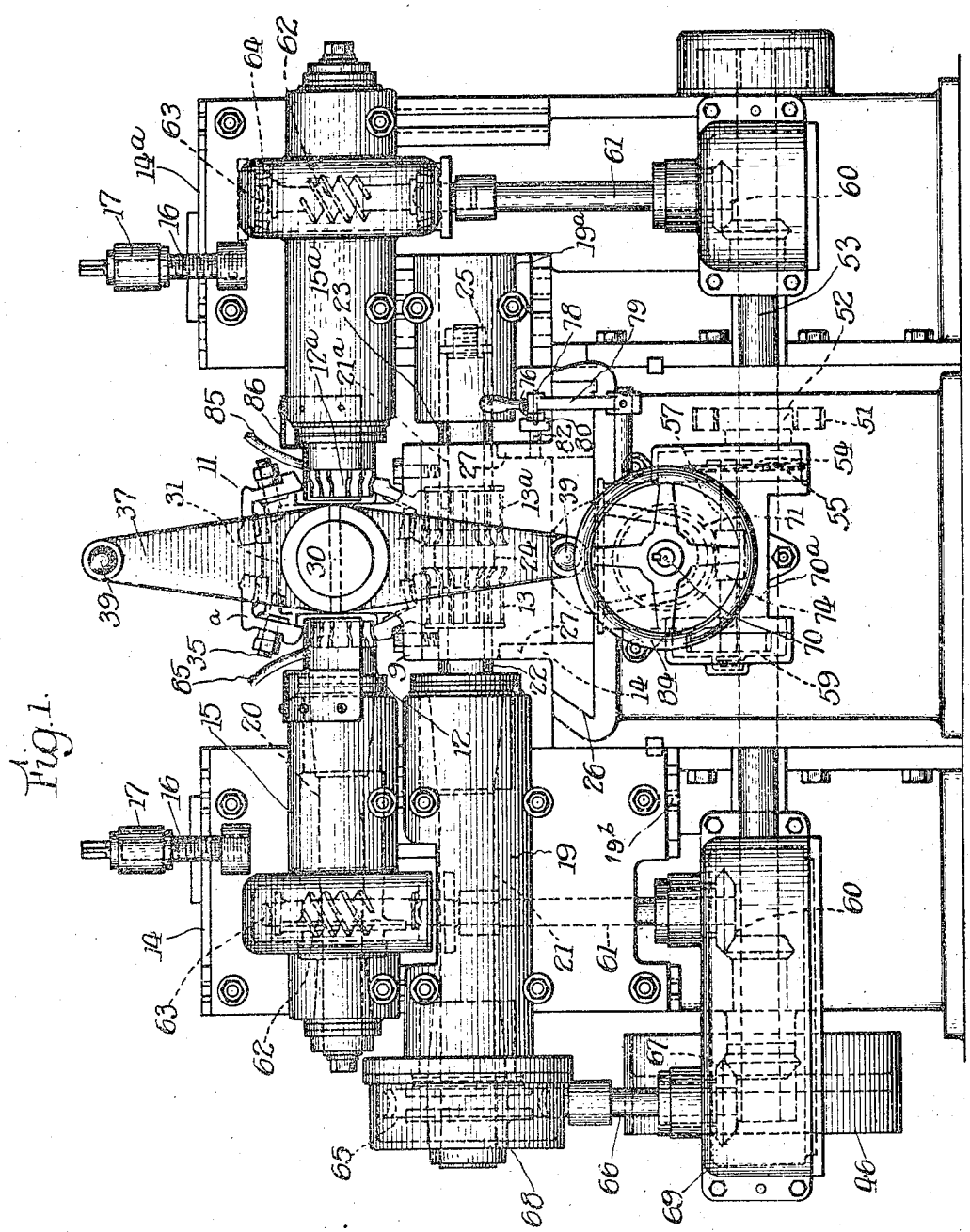
Figure 1 is a front elevational view of the machine.

The machine comprises generally a bed 7 having mounted thereon a table 8 which is slidable transversely and has at its forward and rear ends uprights 9 and 10 in which is pivoted a work holder 11. I provide in the present instance two pairs or sets of milling cutters 12—12$^a$ and 13—13$^a$. The cutters 12, 12$^a$ are end mills, spaced apart longitudinally of the bed so as to permit the work holder to pass therebetween, and the cutters 13, 13$^a$ are disposed below the cutters 12, 12$^a$. The work holder is adapted to pass between the cutters 12, 12$^a$ with its lower portion supporting separate pieces of work for passage between the upper and lower cutters, and with its uppper portion projecting above the upper cutters to permit easy replacement of the work.

To support the forward portion of the table 8, the bed 7 comprises a portion 7$^a$ extending forward from a main longitudinally extending portion 7$^b$. Near the opposite ends of the latter I provide uprights or columns 14 and 14$^a$ the forward faces of which are provided with suitable vertically disposed ways in which are mounted bearing heads 15 and 15$^a$ having spindles for the upper or end mills 12 and 12$^a$. Said heads are mounted for up and down adjustment by any suitable means. Herein I have shown in each instance a screw 16 mounted in an arm 17 carried by the upright or column and screw-threaded at its lower end in a lug 18.

Projecting forwardly from the bearing head below the adjustable heads 15—15ª, I provide bearing heads 19 and 19ª also adjustable in ways 19ᵇ. In these lower heads are journaled the spindle and arbor for the lower set of cutters 13—13ª. For each of the upper cutters 12, 12ª I provide a spindle 20 which terminates a short distance beyond the inner end of the head, the cutters being suitably secured upon the ends of the spindles for quick detachment in any suitable and well known manner.

For the cutters 13, 13ª I preferably provide a driving spindle 21 suitably journaled in the head 19 and having removably secured thereto in any well known way an arbor 21ª extending between the heads and journaled in the head 19ª. Said arbor carries the cutters 13, 13ª which are held in properly spaced relation upon the portion 21ª by means of sleeves 22 and 23 and an intermediate bushing 24. Endwise movement of the cutters on the shaft portion 21ª is prevented by a nut 25 engaging with the end sleeve 23.

The table 8 is suitably guided upon the bed in a pair of ways 26, and projecting upwardly along opposite side edges of the table are a pair of flanges 27 (Fig. 3) constituting end walls for the table and providing in effect a box or receptacle into which the chips may fall, it being observed that the table is located directly below the lower cutters 13—13ª. To permit the passage of the chips into the bed below the table, the latter is provided with a plurality of relatively large apertures 28 near opposite sides thereof.

The work holder 11 which is supported upon the front and rear uprights or posts 9 and 10 comprises in the present instance an elongated block 29 approximately rectangular in form. It is pivotally supported through the medium of a relatively large shaft 30 upon the uprights 9 and 10, suitable bearings 31 and 32 being provided on the respective uprights for this purpose. At its rear end the shaft 30 is reduced somewhat in diameter and is provided with a nut 33 screw-threaded upon the extreme end of the shaft projecting from the bearing 32; and it will be seen that the rear upright 10 is made heavy so as to withstand the strain to which it is subjected in drawing the work past the cutters. A collar 34 preferably is inserted between the bearing 32 and the enlarged portion of the shaft.

In the present instance the block 29 is constructed at each of its four corners so as to provide seats for splice bars represented by the letter $a$. These bars may conveniently be secured to the block by means of bolts 35 permanently anchored in the block and equipped with nuts 36. The bolts 35 are so arranged as to register with the holes in the bar $a$. Thus the latter may readily be placed upon the block and clamped in position by means of the nuts 36. To accommodate bars of slightly different forms the holder is preferably equipped with removable seat plates 36ª and 36ᵇ (Fig. 3).

The axis of the shaft 30 is located midway between the cutters 12 and 12ª, and the cutters 13 and 13ª are disposed below the axis of the work holder. Thus the lower cutters are arranged to mill the under or lowermost surfaces of the bars, while the upper edges thereof are simultaneously milled by the cutters 12 and 12ª. It will be observed, however, that the axis of the cutters 12 and 12ª is disposed slightly below the axis of the shaft 30 in order to provide clearance between the bars when in their upper or loading position (Fig. 3) and the upper cutters 12 and 12ª. It will also be seen that the work holding fixture in entering between the two end mills 12, 12ª coacts therewith to form a chamber above the table for confining the chips and the coolant.

For rotating the work holder in moving the bars $a$ from their upper or loading position into their lower or operative position, I provide a T-bar 37 rigidly secured at its center upon the forward end of the shaft 30 which is reduced slightly for passage through the bearing 31. This bar carries at its extreme ends indexing plungers 38 having handles 39 projecting forwardly from the bar and adapted to enter a socket 40 provided by a bushing set in the extreme forward end of the table 8. If desired, each of the plungers 38 may be provided with a pair of annular grooves 41 with which a suitable detent 42 in the bar 37 is adapted to coact to hold the plunger in desired position. By this means the work holder may be manually operated through 180 degrees to carry the work from a loading to an operative position, and the holder is held in such positions by the plungers 38. To assist in holding the work holder against pivotal movement I provide in the bearing 32 for the rear end of the shaft a shoe 43 (Fig. 4) entered in a groove in the bearing and seated upon the upper side of the shaft. Said shoe is adapted to be moved into clamping engagement with the shaft by means of a screw 44, the upper end of which has rigid therewith a lever 45 extending forwardly a substantial distance as shown in Fig. 2. Movement of this operating lever rotates the screw 44 to move the shoe 43 and thereby clamp or release the shaft 30 (as shown in Fig. 4) depending upon the direction of rotation of the said screw.

The means for driving the spindles 20 and 21 will now be described. 46 designates a drive pulley at the left hand end of the machine (Fig. 1) mounted upon a shaft 47 which is suitably journaled in the rear or main portion 7ᵇ of the bed. The opposite end of this shaft 47 is connected by change speed gears 48 and 49 with a forward parallel shaft 50. The latter substantially centrally of the bed is connected by means of gears 51 and 52 with a third shaft 53 directly forward of the shaft 50. The shaft 53 has a sprocket wheel 54 thereon which is connected by means of a chain 55 with a sprocket 56 on a shaft 57 mounted forwardly of the bed. Parallel with the shaft 57 is a shaft 58 (Fig. 2) which is connected to the shaft 57 by means of a pair of change speed gears 59.

The spindles 20, 21 are driven from the shaft 53 as is also the table through connection with the shafts 57 and 58. For driving each of the spindles 20, said shaft 53 is connected by bevel gearing 60 with a vertical shaft 61 the upper end of which carries a worm 62 meshing with a worm wheel 63 on the spindle. The upper ends of the shaft 61 are preferably mounted in roller bearings 64 suitably supported in the heads 15 and 15ᵃ. The spindle driving mechanism described is of a well known character and while it is preferred, any other suitable driving means may be employed.

The lower spindle 21 may be similarly driven from the shaft 53 by means of a worm drive 65 connected with a projecting end of the shaft 53 through the medium of a vertical shaft 66 and bevel gearing 67. A suitable housing 68 is provided for the worm drive gearing 65, and a housing 69 is provided for the bevel gearing 67, the shaft 66 being journaled at its opposite ends in the housings 68 and 69.

For actuating the table from the shaft 53 I utilize the shafts 57 and 58 and associated clutch controlled connections to effect the operation of a feed screw 70 whereby to feed the work to the milling cutters at a proper rate of speed and return it rapidly to its forward position. The feed screw 70 extends in a front to rear direction, (Fig. 2) being suitably journaled in the bed, and at its forward end carries two worm wheels 71 and 72 which are arranged to be connected with the screw by means of a sliding clutch member 73. Said worm wheels 71 and 72 mesh respectively with worms 74 and 75 on the shafts 57 and 58, and the gear ratio is such that when the clutch member is operated to drive the worm wheel 72, the feed screw 70 is driven at a slow speed and in a direction to feed the work into engagement with the milling cutters; and conversely when the clutch is operated to connect the worm wheel 71 with the feed screw 70, the latter is reversely operated at a high rate of speed so as to effect a quick return of the work holder. Preferably the gearing connections for driving the feed screw are suitably housed within a housing 70ᵃ (Fig. 1).

Preferably I provide means for automatically controlling the movements of the work holder. Thus I provide a stop bar 76 having one end slidably supported at 77 on the bed and its other end pivotally connected as at 78 with a clutch shifting hand lever 79. The bar 76 is provided with a pair of stops 80 and 81, and the table carries a stop pin 82 adapted to engage with the stops 80 and 81. The arrangement is such that when the table is moved inwardly far enough to complete the milling of the work, the pin 82 engages the stop 81 to operate the clutch member 73 and cause the feed worm 70 to be reversely rotated by the worm wheel 71, worm 74 and shaft 57 which results in a return movement of the table at a relatively high speed. Conversely, when the pin 82 in the outward travel of the table strikes the stop 80, the clutch is operated into neutral position. The table is thus brought to rest in which position it remains until the operator sets it in motion through the manual operation of the lever 79. As will be apparent from Fig. 2, the connection between the feed screw 70 and the table is accomplished through a depending nut 83 which is secured to the under side of the table and with which the screw has a threaded engagement. On the forward end of the feed screw 70 I provide a hand wheel 84 for the manual operation of the table for purposes of adjustment.

A lubricating fluid or coolant is supplied in a large volume to both sets of milling cutters by any suitable means. I have herein shown a pair of conductors 85 for the upper cutters 12 and 12ᵃ, (Fig. 1), which conductors communicate with a suitable source of supply (not shown) and discharge upon the upper sides of the cutters.

I provide over said cutters 12 and 12ᵃ a pair of arcuate guard members 86 secured to the spindle bearing heads 15 and 15ᵃ. As shown clearly in Figs. 1 and 3, the upper portion of the work holder projects above the inner ends of these members 86, so that the splice bars carried by such upper portion are disposed above the guard members. Thus it will be seen that the splice bars may be fastened to the work holder in the loading operation without any danger to the operator because of the close proximity of the upper cutters. The coolant is conducted to the lower set of cutters 13—13ᵃ by means of a pair of conductors 87 (one only being shown, Fig. 2).

It will be observed that the members 86 in addition to serving as guards to protect the workman from injury, also direct the chips downwardly onto the table. As the chips mingle with the coolant they fall downwardly upon the table, and, because of the provision of the relatively large apertures 28 in the table the chips readily find their way into the base. The latter may be equipped with any suitable clean-out opening indicated at 88 in Fig. 2.

Preferably the feed screw 70 operates in an oil bath which I provide by means of an elongated trough 89 (Fig. 3) upon the under side of the table. As shown in said figure, the apertures 28 are disposed on opposite sides of said trough so that the chips do not enter the trough.

In Fig. 5 I have shown a railway rail having a pair of splice bars applied thereto which have been reclaimed in accordance with my invention. The original form of the bars is shown in broken lines, and it will be readily apparent that the surfaces which have become worn in use are the upper and lower inclined surfaces indicated at $b$ and $c$. The operation of reducing the bars to form renewed wearing surfaces $b$ and $c$ involves, therefore, the milling of the upper and lower sides of the bar which I accomplish in my machine in a single operation. By way of summary this operation is as follows:

Assuming that the parts occupy the positions shown in Fig. 2, and that in the previous operation the lower bars upon the work holder have been milled, the operator releases the clamp at the rear end of the work holder shaft 30 by operating the lever 45, and, grasping the handles 39 at the opposite ends of the T-bar 37 at the forward end of the shaft, withdraws the lower plunger 38 from the socket 40 in the forward end of the table and swings the work holder through 180 degrees. Previously he has clamped in position upon the upper side of the work holder a pair of splice bars to be milled. In such swinging movement said bars are carried into position for movement between the two sets of milling cutters. In this position they are held by one of the plungers 38 engaging the socket 40, and the shaft is further held against turning by the operation of the lever 45 to clamp the rear end of the shaft.

The operator now pulls the clutch lever 79 forwardly, setting in motion the feed screw 70 actuated by the worm wheel 72 and the table moves inwardly carrying the bars between the upper cutters 12 and 12ᵃ and the lower cutters 13 and 13ᵃ and forming new wearing surfaces $b'$ and $c'$ (Fig. 5). During the milling operation, the operator removes the previously milled bars now occupying an uppermost position, and fastens in place another set of bars.

When the table has moved inwardly to carry the work just beyond the milling cutters, the pin 82 on the table engages the stop 81 on the stop bar 76 and in operating the clutch lever 79 effects a driving connection between the high speed worm wheel 71 and the feed screw 70, with the result that the table moves forwardly at a relatively high speed. As the table approaches the extreme forward end of its movement the said member 80 is engaged by the pin 82 and the clutch lever operated to throw the clutch member 73 into neutral position. The movement of the table thus ceases so that the operator may rotate the work holder as before to carry the completed work into inoperative position for removal, and the new work into operative position as above set forth.

I have found in practice that with my machine a single operator is capable of attending to the operation of two machines. The construction and arrangement of the work holder is such that the bars may be quickly and easily removed from and fastened upon the work holder and there is an entire absence of the annoyance heretofore experienced with prior machines of coolant and chips discharged in all directions about the vicinity of the milling cutters. Indeed, in prior machines it has not been possible to reload the work holder during the milling operation, so that it has been necessary to take out from the milling time sufficient time for this loading and unloading operation. Because the bars are completed in one operation it is unnecessary to set the work more than once. In previous machines, so far as I am aware, only one surface is milled at a time so that two setting operations are necessary. A further advantage over prior machines is that the chips find their way without assistance through the table into the bed of the machine, whereas formerly it has been necessary to employ a blast of air after each operation to clear from the machine the chips made in the previous operation.

The capacity of the machine of my invention has in practice proven to be substantially greater, because of the advantages above set forth, than prior machines, and whereas in such prior machines two attendants have been necessary for each machine, one operator is capable of attending to the operation of two of the present machines.

A feature of substantial importance is that the labor required in loading the work upon the holder and removing it therefrom is greatly minimized. One reason for this is that the operator is able to assume a position directly on opposite sides of the work holder, avoiding any necessity for handling the relatively heavy bars at arms length, and also avoiding the necessity of climbing onto the machine in order successfully to manipulate the tools employed in fastening the work in place as has heretofore been the case.

I claim as my invention:

1. A milling machine having, in combination, a bed comprising a rear elongated portion and a forwardly extending front portion, said rear portion having an upright thereon, a table slidable transversely in the bed over said front portion, cutting means mounted on said upright, a work holder mounted on the table, said table having one or more apertures therein through which chips are arranged to pass into the bed, and means for moving the table relative to the cutting means.

2. A milling machine having, in combination, upper and lower milling cutters, a work holder pivoted to turn on an axis perpendicular to a plane passing through the axes of said cutters, said holder being adapted for the fastening of separate pieces of work upon its upper and lower sides, and means for locking the work holder against rotation.

3. A milling machine having, in combination, a bed, two sets of milling cutters mounted on longitudinal axes disposed one above the other, a work holder mounted to turn on an axis extending transversely of the bed, the milling cutters of one of the sets being spaced apart a distance such that relative movement between the work holder and said spaced cutters is permitted, and said holder being adapted for the fastening of separate pieces of work on each of two sides thereof, the arrangement being such that the pieces of work on the lower side of the holder are adapted for simultaneous engagement by the upper and lower milling cutters through rectilinear movement, and means for effecting relative rectilinear movement between the table and said cutters.

4. A milling machine having, in combination, a pair of cutters mounted on parallel axes spaced one above the other, work holding means comprising a member pivoted to turn on a transverse axis and adapted in turning through substantially 180 degrees to move a piece of work from an upper or loading position to a lower or operative position, said cutters being arranged to operate upon opposed surfaces of said work simultaneously in relative rectilinear movement between the cutting means and the work, and means for effecting such relative rectilinear movement.

5. A milling machine having, in combination, two sets of alined milling cutters mounted on spaced parallel axes, and work holding means operable between the cutters of one set and pivoted to turn on a transversely disposed axis located to one side of both of said parallel axes, the work holding means being adapted to support separate pieces of work for simultaneous engagement by cutters of each set.

6. A milling machine having, in combination, a pair of milling cutters mounted on spaced parallel axes, one above the other, a work holder extending transversely of the axis of said cutters and adapted to support a piece of work for engagement by both of said cutters simultaneously, means for effecting relative movement between the cutters and said support, and a guard enclosing the upper cutter, said support during the cutting operation being arranged to coact with said guard to form a downwardly opening housing above the upper cutter.

7. A milling machine having, in combination, a pair of cutters mounted on spaced parallel horizontal axes, a table mounted below said cutters, a work support mounted on the table and arranged to carry a piece of work for engagement by both cutters, and means for effecting relative movement between the table and said cutters, said support being adapted in such movement to deflect chips from one of said cutters downwardly upon the table.

8. A milling machine having, in combination a pair of cutters mounted on spaced parallel horizontal axes, a table mounted below said cutters, a work support mounted on the table, means for effecting relative movement between the table and said cutters, said support being adapted in such movement to deflect chips downwardly upon the table, and a guard means above the upper cutter adapted to coact with said support in deflecting the chips downwardly.

9. A milling machine having a pair of upper cutters mounted coaxially but in spaced relation, a table having an elongated substantially rectangular supporting member of a width slightly less than the distance between the cutters so as to be adapted to enter therebetween, a second pair of cutters mounted below the first mentioned cutters in spaced relation thereto, said support being pivoted on an axis at right angles to the axis of said cutters and adapted to have separate pieces of work fastened thereto for passage between said upper and lower cutters simultaneously, each piece passing between an upper and a lower cutter.

10. A milling machine having a pair of upper cutters mounted coaxially but in spaced relation, a table having an elongated substantially rectangular supporting member of a width slightly less than the distance between the cutters so as to be adapted to enter therebetween, a second pair of cutters mounted below the first mentioned cutters in spaced relation thereto, said support being adapted to have separate pieces of work fastened thereto for passage between said upper and lower cutters simultaneously, and a table upon which said support is mounted having openings therein to permit the passage of chips therethrough.

11. A milling machine having a pair of upper cutters mounted coaxially but in spaced relation, a table having an elongated substantially rectangular supporting member of a width slightly less than the distance between the cutters so as to be adapted to enter therebetween, a second pair of cutters mounted below the first mentioned cutters in spaced relation thereto, said support being adapted to have separate pieces of work fastened thereto for passage between said upper and lower cutters simultaneously, and a table upon which said support is mounted having openings therein to permit the passage of chips therethrough, said support being rotatably mounted on said table upon a transverse axis located slightly above the axis of the upper cutters and having means whereby pieces of work may be secured thereto while the aforesaid pieces of work are being milled.

12. A milling machine having a pair of upper cutters mounted coaxially but in spaced relation, a table having an elongated substantially rectangular supporting member of a width slightly less than the distance between the cutters so as to be adapted to enter therebetween, a second pair of cutters mounted below the first mentioned cutters in spaced relation thereto, said support being adapted to have separate pieces of work fastened thereto for passage between said upper and lower cutters simultaneously, and a table upon which said support is mounted having openings therein to permit the passage of chips therethrough, said support being rotatably mounted on said table upon a transverse axis located slightly above the axis of the upper cutters and having means whereby pieces of work may be secured thereto while the aforesaid pieces of work are being milled, and guard members for the upper cutters arranged to permit the said new pieces of work to be secured in position during the cutting operation.

13. A milling machine having, in combination with two milling cutters, a work holder, a table upon which said work holder is rotatably mounted, means for moving the table to feed the work between said cutters including mechanism for automatically returning the table at the end of the cutting operation to its initial position, and means for manually rotating the work holder from a loading position to an operative position while in such initial position.

14. A milling machine having, in combination, cutting means, a table, a work holder mounted on said table and adapted for movement therewith transversely of said cutting means, said work holder including a shaft and said table having at its rear end means providing an elongated bearing for said shaft and means providing a rotatable support for said shaft at its forward end, and means in said bearing for rigidly clamping the shaft against rotation.

15. A milling machine having a bed, a column at one end of the bed, a pair of milling cutters mounted on said column one above the other, a table mounted on the bed for transverse movement, a work holder rotatably mounted on the table and adapted to support a piece of work for passage between said cutters, means for conducting a coolant to the cutters, said table having apertures therein to permit the passage therethrough of the coolant, and means for reciprocating the table.

16. A milling machine having a bed, a table movable thereon, a milling cutter mounted above the table, a work holder on the table, means for moving the table to carry work on said work holder into engagement with said milling cutter including a feed screw and a nut on the under side of the table engaging said work, and means providing an oil trough upon the under side of the table in which said screw is enclosed, said table having apertures upon opposite sides of said trough through which chips may pass into the bed.

17. A milling machine having a pair of axially alined end mills spaced apart, a second pair of cutters spaced inwardly with respect to the end mills, and a work holding fixture mounted for endwise movement between the end mills, said fixture being also adapted to be turned to present work on either side to said cutters.

In testimony whereof, I have hereunto affixed my signature.

GUSTAF DAVID SUNDSTRAND.